Dec. 29, 1942.  J. J. COBBS  2,306,523
WHEEL
Filed May 18, 1942    2 Sheets-Sheet 1
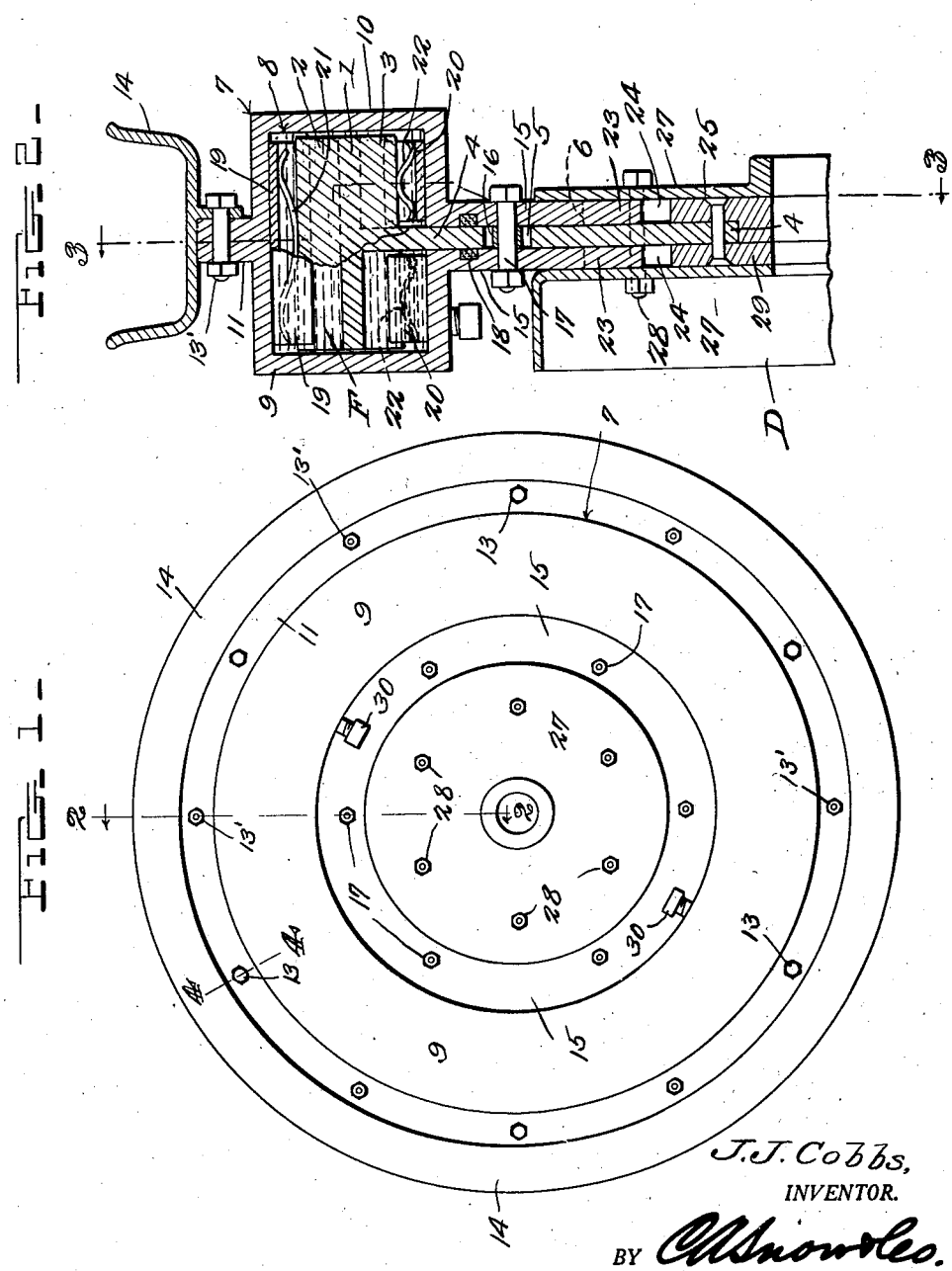
J. J. Cobbs,
INVENTOR.
BY Knowles.

Dec. 29, 1942.   J. J. COBBS   2,306,523
WHEEL
Filed May 18, 1942   2 Sheets-Sheet 2
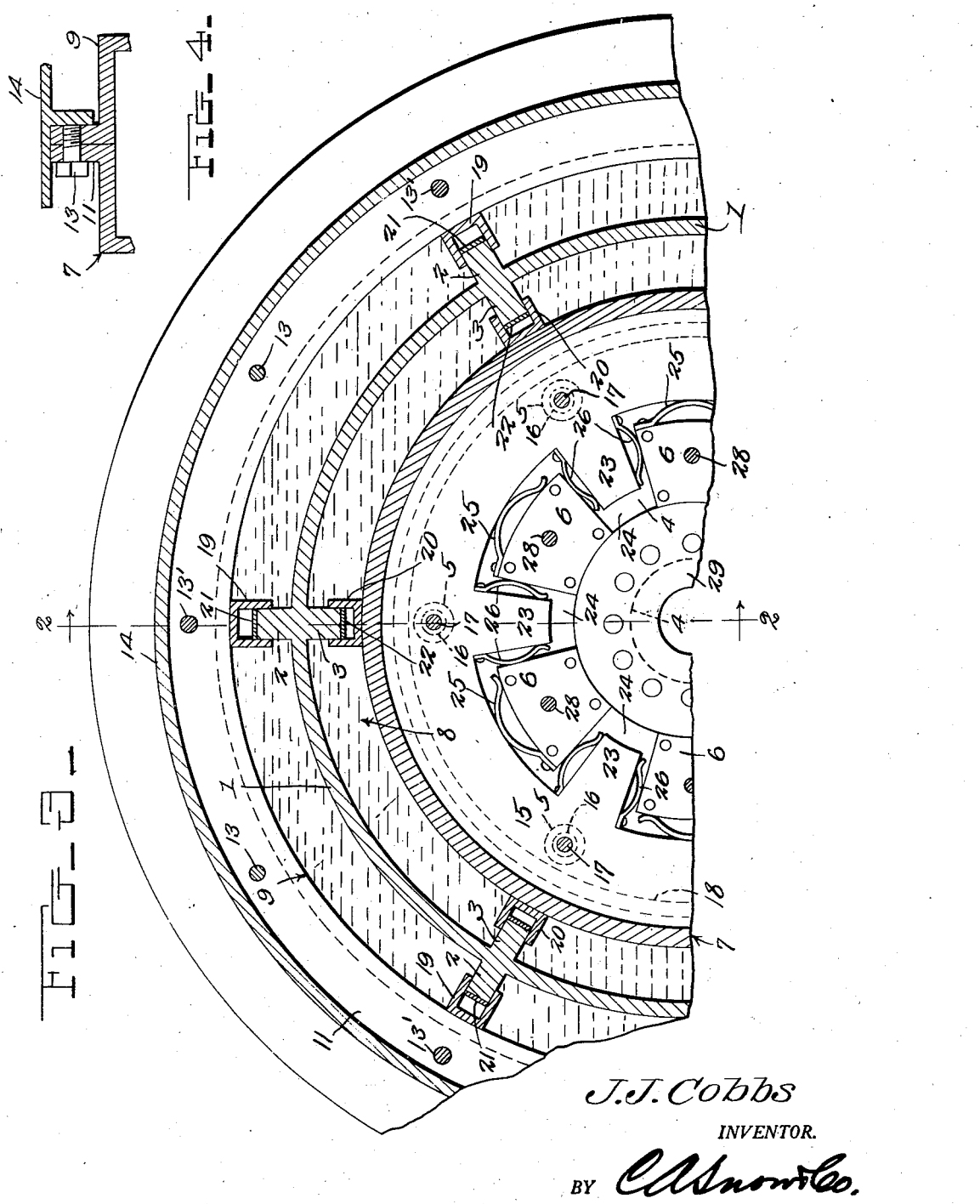
J. J. Cobbs
INVENTOR.

Patented Dec. 29, 1942

2,306,523

UNITED STATES PATENT OFFICE 2,306,523

WHEEL

John James Cobbs, Roanoke, Va.

Application May 18, 1942, Serial No. 443,479

7 Claims. (Cl. 152—55)

This invention relates to vehicle wheels, one of the objects being to provide a wheel so constructed as to absorb shocks and thus permit use of solid tires in lieu of pneumatic tires.

A further object is to provide a wheel utilizing a fluid as the main cushioning or shock-absorbing element, this fluid being in the form of an endless stream contained between relatively movable annular members, means being provided whereby the flow of the fluid is retarded.

A further object is to provide supplemental cushioning means for maintaining the relatively movable parts normally in a substantially predetermined relation.

A still further object is to provide a wheel the parts of which can be easily formed and readily assembled and taken apart.

A still further object is to provide a wheel which is not objectionable in appearance.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a side elevation of the wheel.

Figure 2 is a central vertical section on the line 2—2, Figures 1 and 3.

Figure 3 is a section on line 3—3, Figure 2.

Figure 4 is a section on line 4—4, Figure 1.

Referring to the figures by characters of reference, 1 designates a piston in the form of a ring which is substantially T-shaped in cross-section and provided at one or more points with transverse baffle blades 2 and 3 extending radially therefrom. The blades 3 are located at opposite sides of the inwardly extended flange 4 of the ring piston while the blades 2 are extended across said piston on its outer or convex surface.

The flange 4 is formed with one or more transverse openings 5 and secured to the sides of this flange at its inner edge are annularly spaced segmental plates 6 forming pockets therebetween.

The ring piston 1 is located within a circular tubular casing 7 defining an area therein which is rectangular in cross-section and constitutes the working chamber 8 of the wheel. The casing is formed of two opposed members 9 and 10 the outer peripheries of which are provided with flanges 11. These flanges are held together by bolts 13 so as to provide a tight fit between them and a wheel rim 14 of any suitable construction can be fastened to the flanges 11 by the bolts 13¹ as shown in Figs. 1 and 2.

The inner peripheries of the sections 9 and 10 of casing 7 are provided with spaced flanges 15 held apart by spacing sleeves 16 located in the respective openings 5 and through which extend bolts 17 which serve to clamp the flanges 15 tightly against the ends of the sleeves. The flanges 15 are adapted to slide on the opposed faces of flange 4 and, in order to prevent leakage of fluid, packing rings 18 can be seated in the flanges for wiping contact with the respective faces of the flange 4.

Extending around and slidable on the blades or baffle members 2 and 3 are the movable baffle members 19 and 20 respectively. Springs 21 are interposed between members 2 and 19 and springs 22 are interposed between members 3 and 20. Thus the members 19 and 20 are constantly pressed against the annular walls of casing 7 and cooperate with members 2 and 3 to form baffles which act to restrict flow of fluid annularly within casing 7 and along ring piston 1.

Tapered arms 23 are extended inwardly from the flanges 15 of casing 7 and are movably seated in the pockets 24 between segments 6. Cushioning springs 25 are interposed between the segments 6 and the inner edges of flanges 15 and additional springs 26 are interposed between the sides of segments 6 and arms 23. The springs 25 and 26, segments 6 and arms 23 are housed between a face plate 27 and a brake drum D. The working chamber 8 in the casing 7 is filled with a liquid, such as a suitable oil indicated generally at F.

The disk or plate 27 is rigidly but removably attached to the segments 6, flange 4 and drum D by means of bolts 28 or the like extending transversely therethrough and the flange 4 is securely attached to the wheel hub 29.

When the wheel is in use as a vehicle support, the springs 25, 22 and 21 serve to hold the rim normally centered. However when the wheel is subjected to more than a normal load or receives an excessive shock, the fluid F will be displaced inasmuch as there are reduced passages around the ends of the baffle members. This displacement, however, will not occur unless the load or the shock is continuous. Otherwise the shock will be absorbed by the displacement of the fluid before the fluid has a chance to flow out of position. Should any of the fluid be displaced around the blades, it would ultimately be equally distributed in the casing 7 due to centrifugal force during the rotation of the wheel and to the gradual action of the springs intending to move the casing 7 into concentric position. As the over-all width of the ring piston is less than the interior width of casing 7, some of the displaced fluid will flow back and forth between the side walls of the casing 7 and the side edges of the piston during relative movement of these parts. Obviously, if desired, holes could be put in the piston to permit back and forth flow of the fluid but this construction is so obvious that illustration thereof is not deemed necessary.

Springs 26 serve to cushion the wheel when started or stopped. In other words these springs pick up or cushion the rotative force while being transmitted from the hub to the wheel rim.

The openings 5 are of course sufficiently large to permit maximum movement of the rim relative to the hub in any direction.

While the wheel is designed especially for use on vehicles, the same could also be used as a pulley where resiliency is desired.

Two normally closed nipples 30 open into the casing 7, one being used for supplying fluid to the casing while the other constitutes an air outlet during the filling operation.

Obviously this complete wheel can be readily substituted for any ordinary automobile wheel without molesting hubs already in use, it merely being necessary to change the cover plates.

What is claimed is:

1. In a wheel a ring piston, a circular tubular casing having a working chamber rectangular in cross-section and housing the piston, said casing being mounted for radial movement in any direction relative to the piston, a liquid extending continuously within the chamber, cooperating means on the piston and the casing for retarding annular flow of the fluid in the casing, a hub secured to the piston, and cooperation means on the casing and piston for transmitting a driving force therebetween.

2. In a wheel a ring piston, a circular tubular casing having a working chamber rectangular in cross-section and housing the ring piston, said casing being mounted for radial movement in any direction relative to the piston, a liquid extending continuously within the chamber, cooperating means on the piston and the casing for retarding annular flow of the fluid in the casing, a hub connected to the piston, cooperating means on the casing and piston for transmitting a driving force therebetween, said means including converging radially disposed arms carried by the casing and spaced segmental members on the piston extending between the arms.

3. In a wheel a ring piston, a circular tubular casing having a working chamber rectangular in cross-section and housing the ring piston, said casing being mounted for radial movement in any direction relative to the piston, a liquid extending continuously within the chamber, cooperating means on the piston and the casing for retarding annular flow of the fluid in the casing, a hub connected to the piston, cooperating means on the casing and piston for transmitting a driving force therebetween, said means including converging radially disposed arms carried by the casing and spaced segmental members on the piston extending between the arms, and cushioning means interposed between the arms and the segmental members and between the segmental members and the casing respectively.

4. In a vehicle wheel a rim, a hub, and a yielding connection between the rim and hub including a ring, a circular casing having a continuous working chamber therein housing the ring, means for attaching said casing to a rim, said casing being mounted to shift radially in any direction relative to the ring, a flange on the ring extending through the casing, cushioning means within the casing and positioned to retard the relative movement of the ring and casing, and a driving connection between the flange of the ring and the casing.

5. In a vehicle wheel a rim, a hub, and a yielding connection between the rim and hub including a ring, a circular casing having a continuous working chamber therein housing the ring, means for attaching said casing to a rim, said casing being mounted to shift radially in any direction relative to the ring, a flange on the ring extending through the casing, cushioning means within the casing and positioned to retard the relative movement of the ring and casing, said means including a fluid extending continuously within the casing along the inner and outer sides of the ring and filling the casing, and cooperating means carried by the ring and casing for retarding the flow of the fluid annularly within the casing, and a driving connection between the ring and casing.

6. In a vehicle wheel a rim, a hub, and a yielding connection between the rim and hub including a ring, a circular casing having a continuous working chamber therein housing the ring, means for attaching said casing to a rim, said casing being mounted to shift radially in any direction relative to the ring, a flange on the ring extending through the casing, cushioning means within the casing and positioned to retard the relative movement of the ring and casing, said means including a fluid extending continuously within the casing along the inner and outer sides of the ring and filling the casing, means carried by the ring for retarding the flow of the fluid annularly within the casing, and a driving connection between the ring and the casing, said connection including segments radially disposed upon the flange, arms extending from the casing and between the segments, cushioning means interposed between the arms and the segments, and cushioning means interposed between the segments and the casing.

7. In a wheel a ring piston, a circular tubular casing having a working chamber rectangular in cross-section and housing and spaced from the piston, said casing being mounted for radial movement in any direction relative to the piston, a liquid extending between the sides of the casing and piston and annularly within the chamber, cooperating means on the piston and the casing for retarding annular flow of the liquid in the casing, a hub secured to the piston, and a driving connection between the casing and piston.

JOHN JAMES COBBS.